(12) United States Patent
Kao

(10) Patent No.: US 7,164,412 B2
(45) Date of Patent: Jan. 16, 2007

(54) KEY FREE MOUSE

(75) Inventor: Tsung-Ching Kao, Hsien Tien (TW)

(73) Assignee: ADO Max Technology Co., Ltd., Taipei Hsien (TW)

( * ) Notice: Subject to any disclaimer, the term of this patent is extended or adjusted under 35 U.S.C. 154(b) by 279 days.

(21) Appl. No.: 09/820,911

(22) Filed: Mar. 30, 2001

(65) Prior Publication Data

US 2002/0140676 A1 Oct. 3, 2002

(51) Int. Cl.
*G09G 5/00* (2006.01)
(52) U.S. Cl. .................. 345/163; 345/164; 345/157
(58) Field of Classification Search ............... 345/163, 345/164; 341/20, 22
See application file for complete search history.

(56) References Cited

U.S. PATENT DOCUMENTS 6,256,013 B1* 7/2001 Siddiqui ..................... 341/20
6,433,779 B1* 8/2002 Woolman .................... 156/159

* cited by examiner

*Primary Examiner*—Lun-yi Lao
(74) *Attorney, Agent, or Firm*—Lowe Hauptman & Berner, LLP

(57) ABSTRACT

A key-free mouse includes a top cover and a bottom cover connected to each other through a pivotal connection of locking pins to locking slots. The locking pins and the locking slots are respectively provided at inner side of the top and the bottom covers at front and rear ends of a longitudinal axis thereof, so that the top cover is pivotally turnable about the longitudinal axis by a predetermined degree relative to the bottom cover to actuate a left or a right switch provided in the mouse. Elastic elements such as springs are provided in the mouse separately at predetermined positions for providing the top cover with suitable supporting elasticity to recover from a pivotally turned and laterally inclined position.

3 Claims, 5 Drawing Sheets

KEY FREE MOUSE

BACKGROUND OF THE INVENTION

The present invention relates to a key-free mouse, more particularly to a mouse having a one-piece top cover pivotally turnable about a longitudinal axis relative to a bottom cover within a suitable degree to touch and thereby actuate a left or a right switch of the mouse.

A mouse is an important peripheral equipment for a computer and has been largely improved in recent years either in its performance or its structural design. For example, a wireless radio-frequency mouse that can be more easily manipulated has been developed to replace a cabled mouse, and a more accurate optical coordinate input means has been developed to replace a ball-type coordinate input means. There is also a mouse having an additional roller-type two-dimensional coordinate input means provided at the top cover for controlling the mouse with a finger. The appearance of the mouse is also frequently changed to attract more consumers. However, as can be found by all consumers, the conventional mouse always has a left and a right key provided at a front end of the top cover. A user moves the mouse with one hand and depresses the left and the right keys with index finger and middle finger, respectively, to control the mouse. This conventional design for a mouse would cause at least the following confusions:

1. The left and the right keys are always arranged side by side at a front end of the mouse, making the top cover of the mouse consisting of at least three parts, namely, two movable keys and one fixed case behind the two keys for supporting a user's palm. Therefore, increased costs are needed to make and assemble different parts of the conventional mouse.
2. The left and the right keys are located at positions corresponding to a user's index finger and middle finger, respectively. It is harmful to a user's index and middle fingers if they are constantly used to depress the left and the right keys for a long term.
3. The two movable keys on the conventional mouse are not freely changeable in their positions and sizes. A big-size key tends to be wrongly depressed, and a small-size key is not convenient for pressing. All users have to handle the conventional mouse in the same manner even the manner is not the best one. There is another commercially available mouse developed for use with an APPLE computer. This type of mouse does not have any key on its top cover, but has a horizontal key provided at a left vertical wall of the mouse depressible with a thumb. The top cover of this type of mouse is provided near an inner rear part with left and right bars for mounting on left and right seats correspondingly provided near an inner rear part of a bottom cover of the mouse, so that the top cover is pivotally turnable about a transverse axis of the mouse relative to the bottom cover. When a front half of the top cover is depressed, it touches and actuates a switch provided in a front space of the mouse. In this design, the rear half of the top cover automatically lifts when the front half is depressed, and a user has to slightly lift his or her palm to suspend over the top cover in response to the lifted rear half. Since this type of mouse is handled in a manner quite different from that usually adopted by most users and is therefore inconvenient for use.

SUMMARY OF THE INVENTION

A primary object of the present invention is to provide a key-free mouse that includes front and rear pivotal means provided in top and bottom covers at front and rear ends of a longitudinal axis of the mouse, so that the top cover is easily pivotally turnable about the longitudinal axis relative to the bottom cover by a predetermined degree to touch either a left or a right switch in the mouse.

The above-described key-free mouse further has elastic elements of a predetermined elasticity mounted therein to providing a supporting elasticity needed for the top cover to recover from a pivotally turned and laterally inclined position.

The pivotal means of the key-free mouse include a front and a rear set of locking pin and locking slot. The locking pins and the locking slots are respectively provided in the top and the bottom cover of the mouse to pivotally engage with one another and thereby quickly connect the top cover to the bottom cover.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
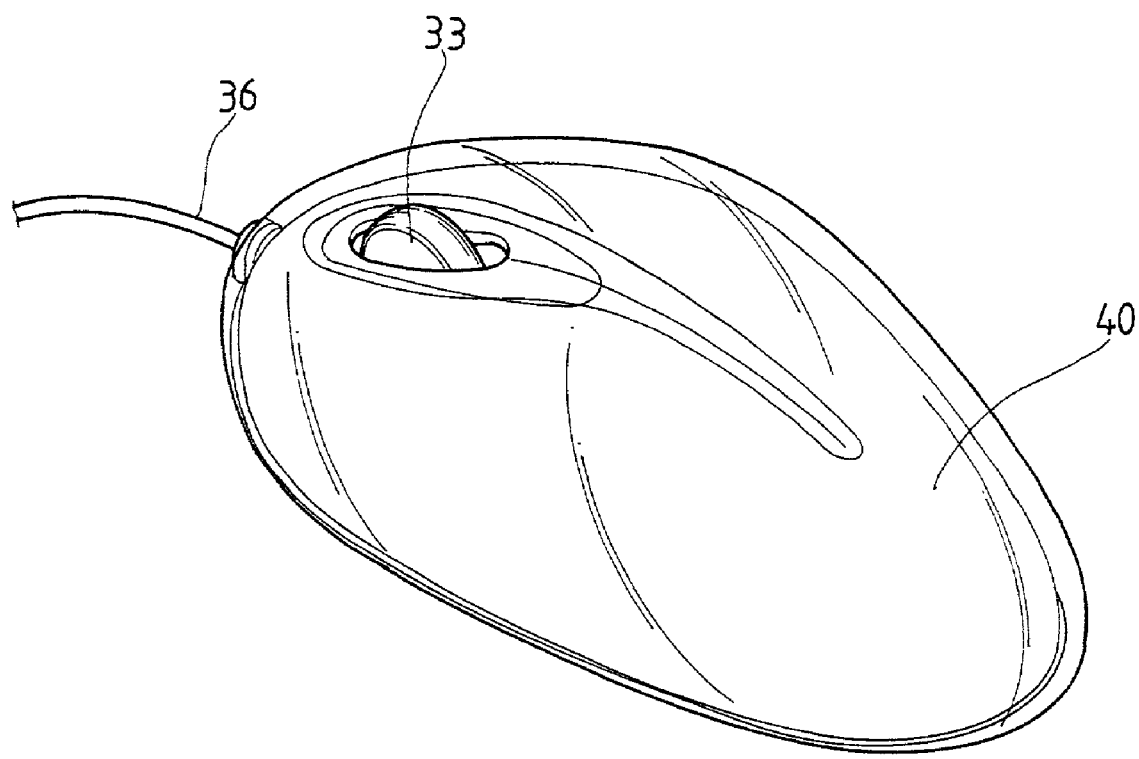
FIG. 1 is an assembled perspective of a key-free mouse according to an embodiment of the present invention.
Figure 2:
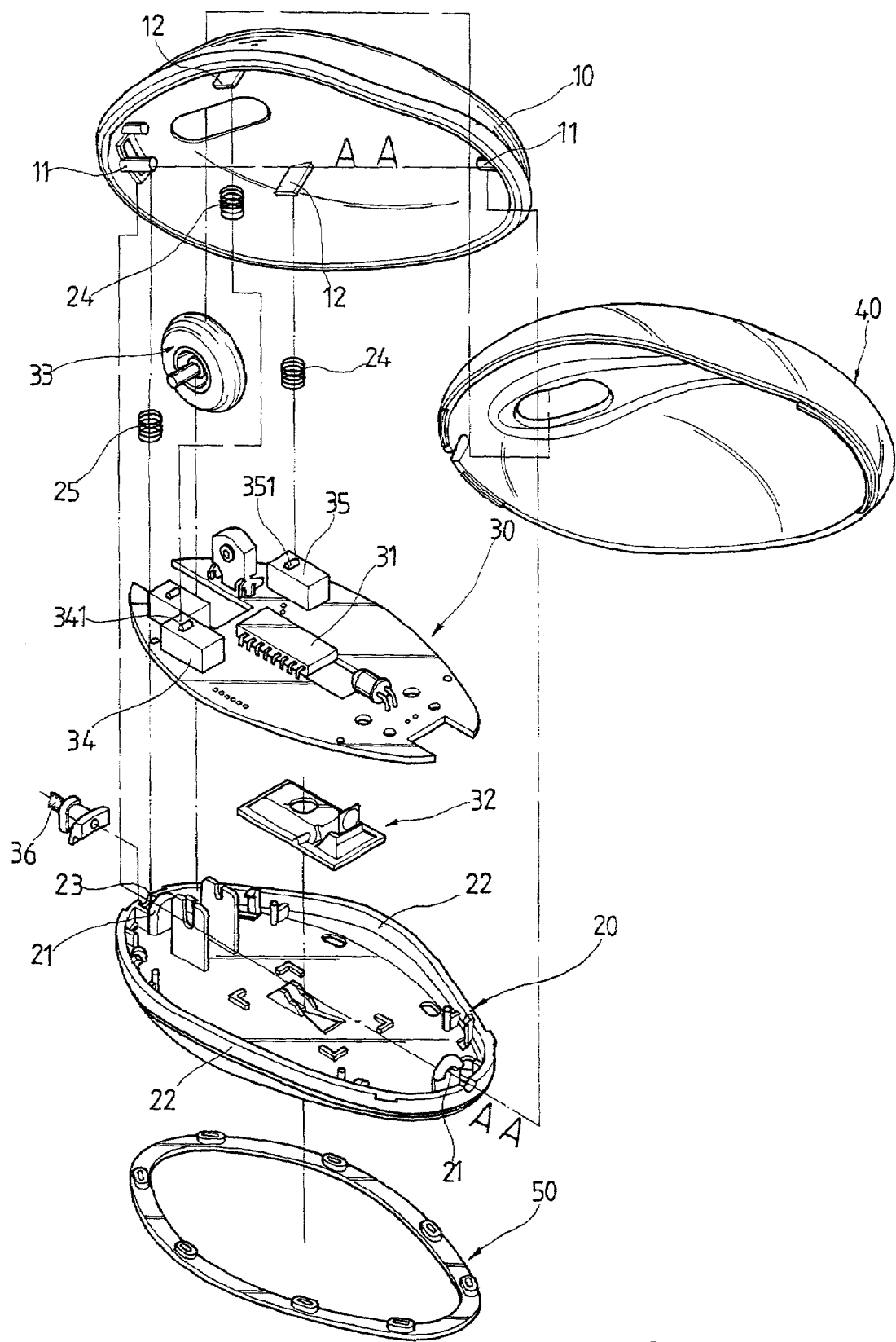
FIG. 2 is an exploded perspective of the key-free mouse of FIG. 1.

Please refer to FIGS. 1 and 2 that are assembled and exploded perspective views, respectively, of a key-free mouse according to an embodiment of the present invention. As shown, the key-free mouse mainly includes a top cover 10, a bottom cover 20, and a circuit board 30 disposed in a space defined between the top and the bottom covers 10, 20.

On the circuit board 30, there is provided conventional electronic components and elements necessary for a mouse to function, such as an integrated circuit (IC) 31, an optical coordinate input means 32, a roller-type two-dimensional coordinate input means 33, left and right switches 34, 35, a power cord 36 for connection of the mouse to a computer, etc. The optical coordinate input means 32 may be replaced with a ball-type coordinate input means (not shown), and the mouse and the computer may communicate with each other through radio-frequency (RF) transmission to omit the power cord 36. For the entire mouse to have a beautiful appearance, a transparent decorative cover 40 may be attached to an outer surface of the top cover 10 by means of ultrasonic welding. A ring member 50 may be set to a peripheral edge of a lower surface of the bottom cover 20 to define a surface with which the mouse contacts while being moved.

Figure 3:
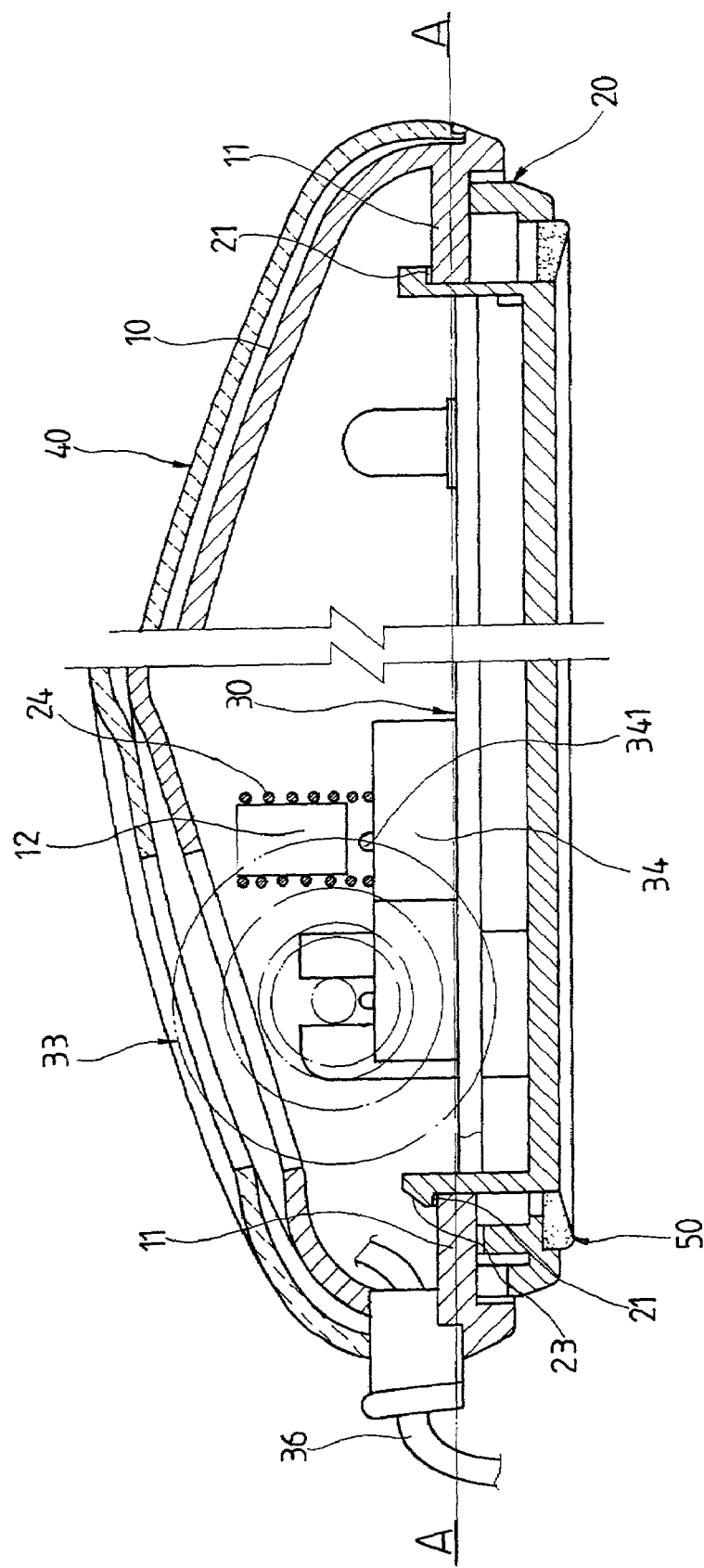
FIG. 3 is a side sectional view of the locking pin and the locking slot shown in FIG. 2.

The present invention is characterized in that the top and the bottom covers 10, 20 are provided in their inner side preferably at front and rear ends of a longitudinal centerline thereof with two locking pins 11 and two locking slots 21, respectively, so that a longitudinal pivot axis A–A' is defined between a front set of locking pin and locking slot 11, 21 and a rear set of locking pin and locking slot 11, 21. As shown in FIGS. 2 and 3, the top cover 10 is adapted to pivotally turn about the pivot axis A–A' by a predetermined degree relative to the bottom cover 20. To avoid showing any slit at left side and right side joints of the top and the bottom covers 10, 20 when the top cover 10 is pivotally turned above the bottom cover 20, a middle section 22 of left and right side walls of the bottom cover 20 are designed to have an increased height. And, to enable the front and the rear locking pins 11 of the top cover 10 to easily engage into the front and the rear locking slots 21 of the bottom cover 20, respectively, the front locking slot 21 is provided at a top with a guiding bevel 23, allowing the front locking pin 11 to easily slip into the front locking slot 21 via the guiding bevel 23 under a minor pressure. Through an engagement of the two locking pins 11 with the two locking slots 21, the top cover 10 is quickly pivotally connected to the bottom cover 20 to form a unitary body without easily separating from each other.

The top cover 10 is provided at an inner surface at positions corresponding to the left and the right switches 34, 35 with two downward extended strips 12, namely, a left and a right strip 12. The strips 12 have a predetermined length such that when the top cover 10 is pivotally turned about the axis A–A' and becomes inclined, either the left or the right strip 12 would be brought to press against an elastic key 341 or 351 provided on the left and the right switch 34, 35, respectively, to make the circuit, as shown in FIGS. 4 and 5.

Figure 4:
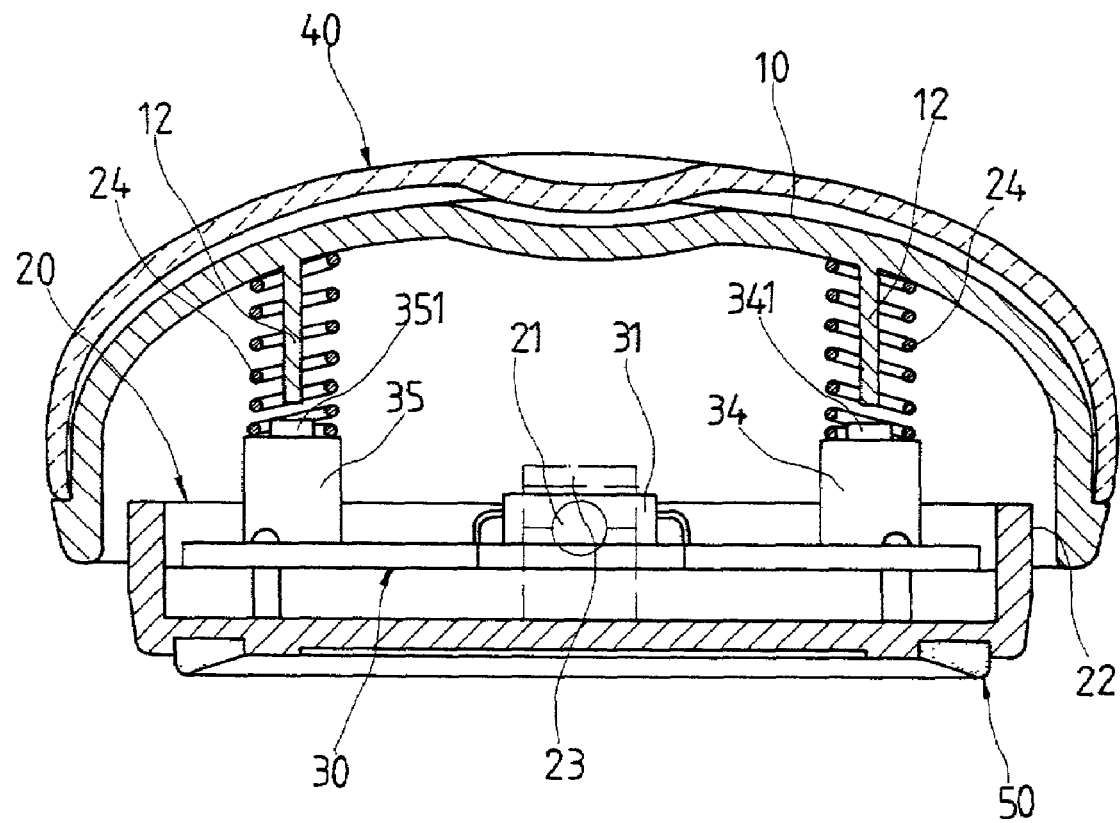
FIG. 4 is a front sectional view of the locking pin and the locking slot shown in FIG. 2.
Figure 5:
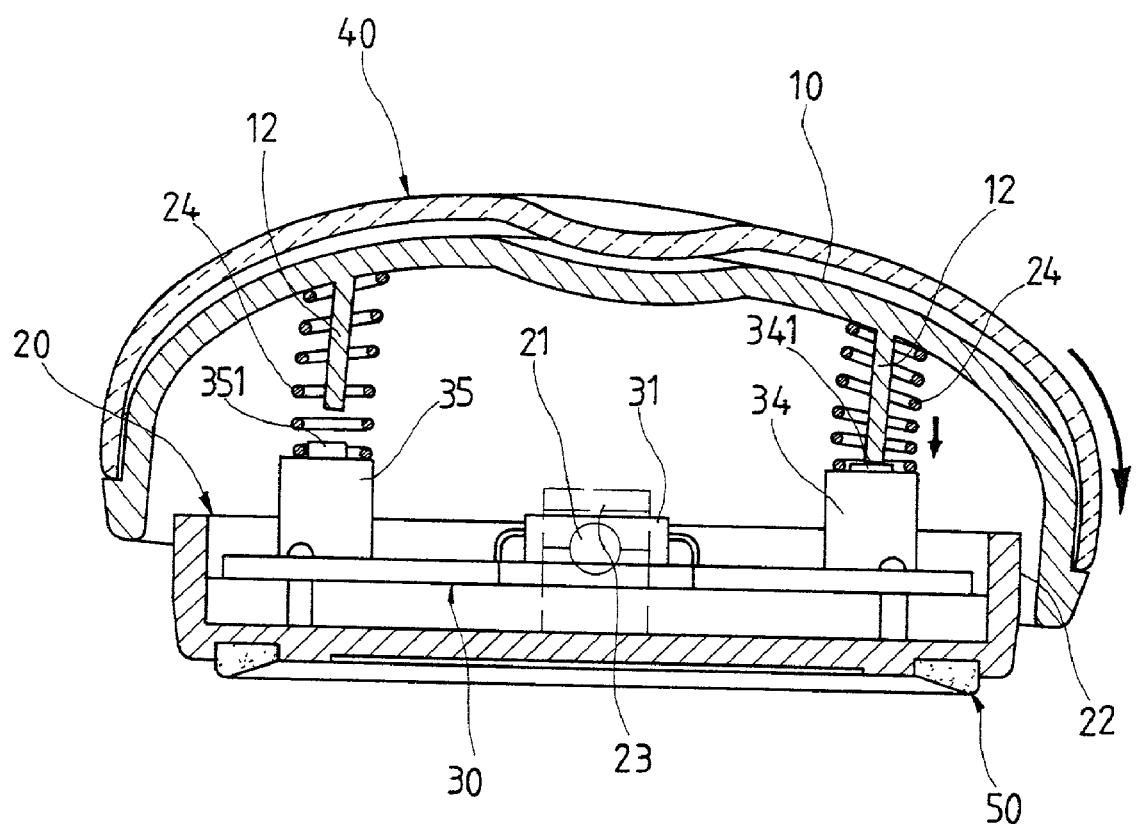
FIG. 5 shows the operation of the left or the right switch shown in FIG. 4.

As can be seen in FIGS. 2, 4 and 5, two elastic elements, such as two springs 24 that have a predetermined elasticity, are connected to the two strips 12 to provide a supporting elasticity needed for the top cover 10 to recover from a leftward or a rightward pivotally turned and inclined position. And, an elastic element such as a spring 25 that has a predetermined elasticity, is provided, for example, in the front locking slot 21 to locate below the front locking pin 11 and provide a supporting elasticity to the front locking pin 11 when said top cover is pivotally turned. The elastic elements 24, 25 also enable suitable adjustments of a sensitivity of the left and the right switches 34, 35 and a smooth turning of the top cover 10 relative to the bottom cover 20, so that the mouse can be more smoothly manipulated. The above-mentioned elastic elements 24 may be directly connected to the two strips 12 or be mounted in the top cover 10 at suitable positions in the vicinity of the two strips 12 to provide the supporting elasticity.

When a user manipulates the key-free mouse of the present invention with one hand, the top cover 10 is always kept in a laterally balanced condition by a supporting force provided by the front and the rear sets of engaged locking pin and locking slot along the pivot axis A–A' that is also the longitudinal centerline of the mouse, as well as the supporting elasticity provided by the two elastic elements 24 in the top cover 10.

When a user wants to make the left switch 34 or the right switch 35, he or she needs only to touch any point on the left or the right half of the top cover 10 with any part of his or her hand to easily turn the left or the right half of the cover 10 about the pivot axis A–A'. Thus, the key-free mouse having a one-piece top cover as provided by the present invention is more convenient for operation than the conventional mouse having finger-touch keys at fixed positions, and advantageously provides users with an alternative way of controlling a mouse.

What is claimed is:

1. A key-free mouse, comprising a top cover and a bottom cover connected to each other to define an internal space for receiving a circuit board therein;

said top and said bottom covers being provided in an inner side at front and rear ends of a longitudinal centerline thereof with two locking pins and two locking slots, respectively, so that a longitudinal pivot axis A–A' is defined between a front set and a rear set of said locking pin and said locking slot that engage with each other to connect said top cover to said bottom cover, and said top cover being adapted to pivotally turn about said pivot axis A–A' by a predetermined degree relative to said bottom cover;

said top cover being provided in an inner surface at positions corresponding to a left and a right switch provided on said circuit board with a left and a right strip having a predetermined length, such that when said top cover is pivotally turned about said pivot axis A–A' and becomes laterally inclined, either said left or said right strip is brought to press against an elastickey provided on each of said left and said right switches of said mouse;

wherein said left and said right strips respectively have a coil spring of a predetermined elasticity connected thereto for providing a supporting elasticity needed for said top cover to recover from a pivotally turned and laterally inclined position, and wherein said locking slot provided at the front end of sais bottom cover has a coil spring of a predetermined elasticity provided therein to locate below said locking pin at the front end of said top cover for providing a supporting elasticity to said front locking pin when said top cover is pivotally turned.

2. The key-free mouse as claimed in claim 1, wherein said bottom cover includes a left and a right side wall that respectively have a middle section with an increased height.

3. The key-free mouse as claimed in claim 1, wherein said locking slot provided at the front end of said bottom cover is provided at a top with a guiding bevel, via which said locking pin provided at the front end of said top cover easily slips into said front locking slot under a minor pressure.

* * * * *